No. 766,029. PATENTED JULY 26, 1904.
J. P. FOSTER.
LOADING DEVICE.
APPLICATION FILED MAY 26, 1904.
NO MODEL. 2 SHEETS—SHEET 2.
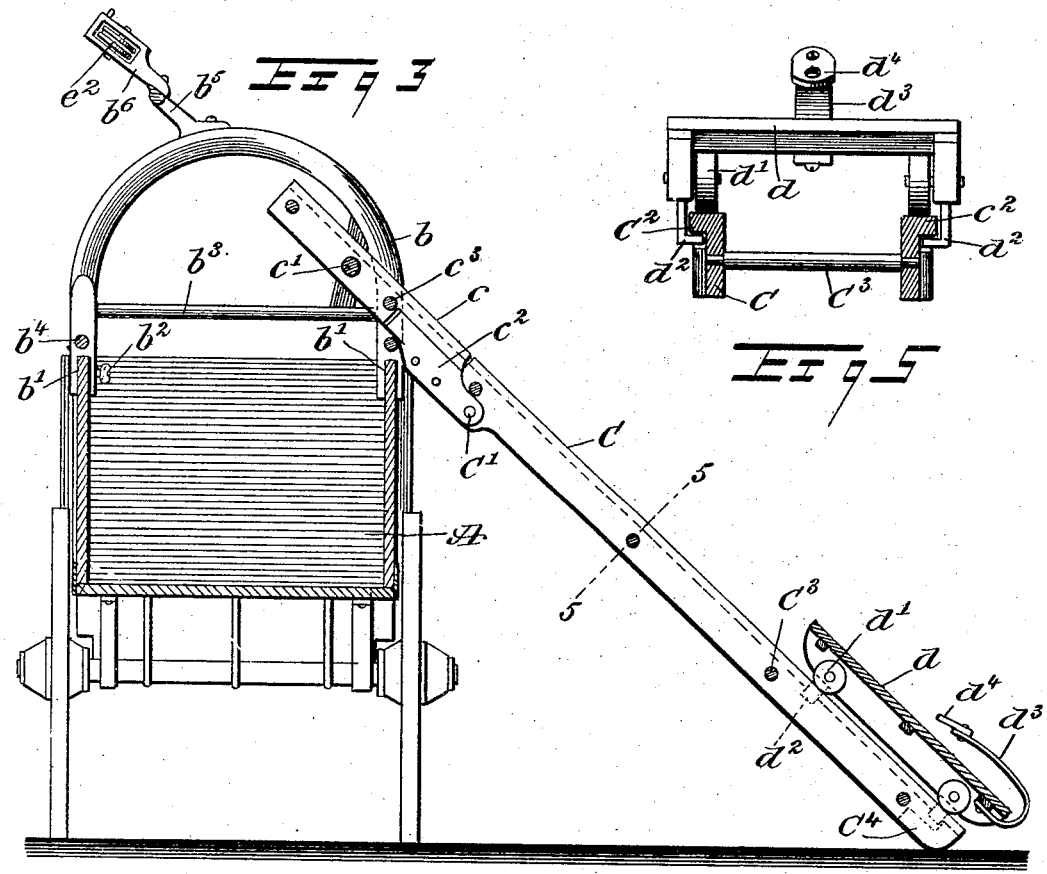
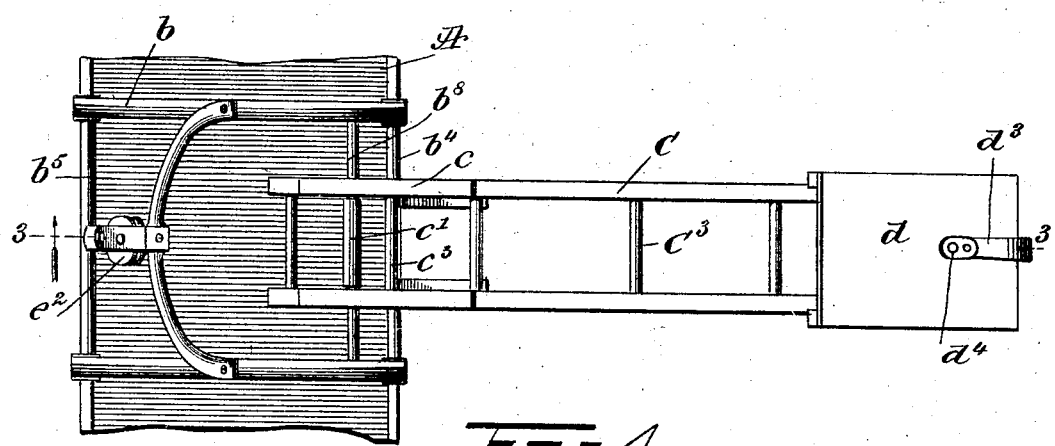
WITNESSES:
INVENTOR
James P. Foster
BY
ATTORNEYS No. 766,029. Patented July 26, 1904.

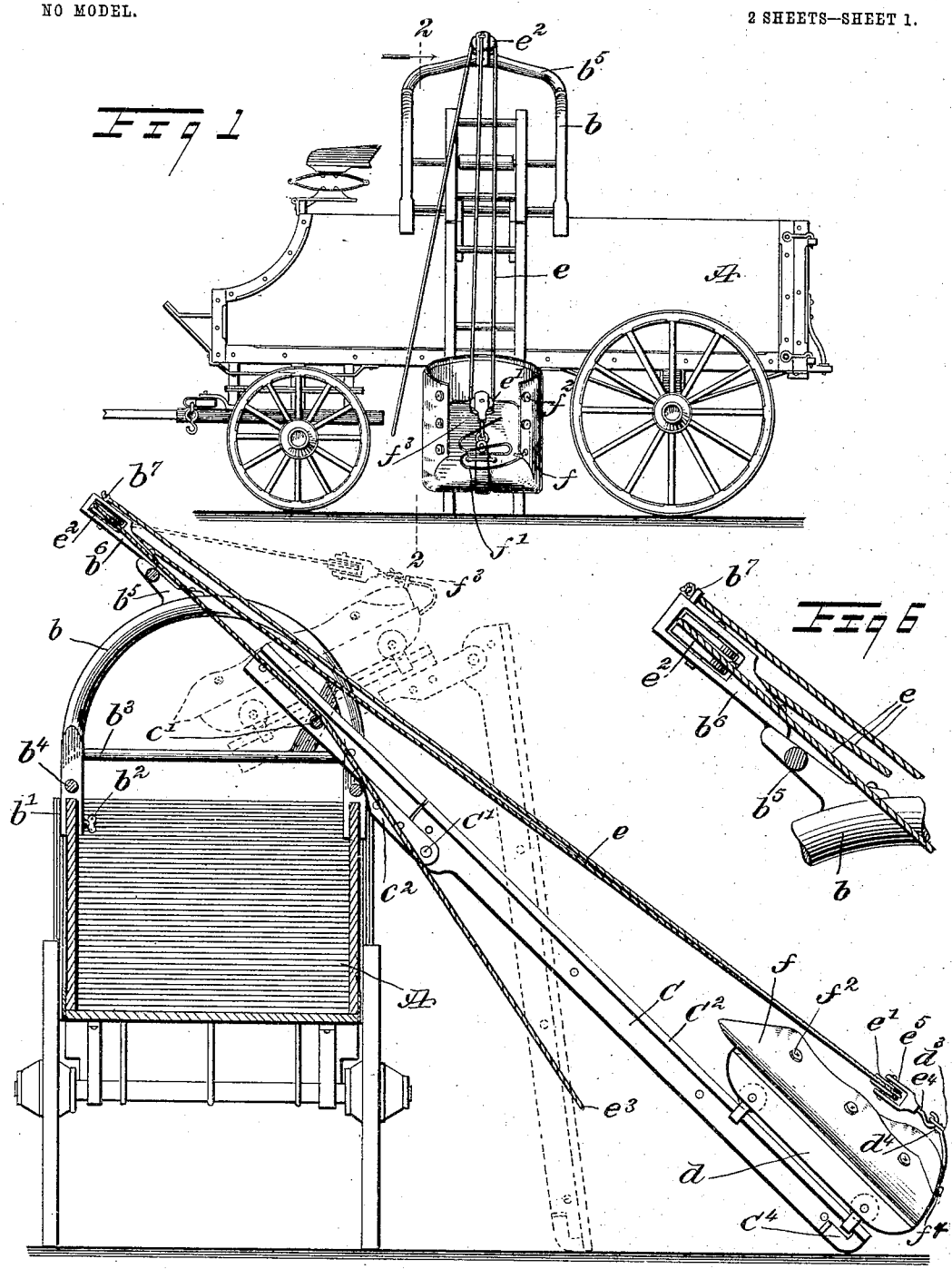

UNITED STATES PATENT OFFICE.

JAMES P. FOSTER, OF LONDON, OHIO.

LOADING DEVICE.

SPECIFICATION forming part of Letters Patent No. 766,029, dated July 26, 1904.

Application filed May 26, 1904. Serial No. 209,820. (No model.)

*To all whom it may concern:*

Be it known that I, JAMES P. FOSTER, a citizen of the United States, and a resident of London, in the county of Madison and State of Ohio, have invented a new and Improved Loading Device, of which the following is a full, clear, and exact description.

My invention relates to a loading device which is capable of general use, but is especially adapted for attachment to a wagon to be used in a field for loading grain and similar materials. Although capable of many other uses, it may conveniently be described as applied to the loading of corn on wagons. At present in many parts of the country corn after it is husked is thrown on the ground and when the wagons come along to receive it it has to be picked up by hand and thrown over the sides of the wagons. This is a very laborious and slow process, and the main object of my invention is to do away with it. This result I accomplish by means of an improved loading device designed to be applied to a wagon and to be used with sacks for holding the corn or other material.

Reference is to be had to the accompanying drawings, forming a part of this specification, in which similar characters of reference indicate corresponding parts in all the figures.

Figure 1 is a side view of a wagon with a preferred form of my invention applied thereto. Fig. 2 is a sectional view of the same on the line 2 2 of Fig. 1. Fig. 3 is a sectional view on the line 3 3 of Fig. 4. Fig. 4 is a plan view of the same device with certain operating parts removed. Fig. 5 is a sectional view on the line 5 5 of Fig. 3, on an enlarged scale; and Fig. 6 is an enlarged view of certain details.

A represents a wagon of the kind ordinarily used for gathering up corn. On the sides thereof is placed a frame $b$. This frame is provided with slots $b'$ in its downwardly-projecting feet, into which the tops of the sides of the wagon are adapted to fit in order that the frame may rest upon the wagon. Screws $b^2$ are preferably provided for holding the feet upon one side of the wagon. The curved main portion $b$ comprises cross-bars $b^3$ and longitudinal bars $b^4$ and is provided in the upper portion of the curved part with a cross-bar $b^5$, which may be curved, as shown in the drawings, or of any desired shape. In addition to the longitudinal bars $b^4$ a bar $b^8$ is preferably employed, extending parallel to the longitudinal bars and acting as a pivot for the upper part $c$ of a slide. This slide is composed of said part $c$ and a second part C. The upper part of section $c$ is provided with a roller $c'$, rotatably mounted upon the bar $b^8$, and with a pair of projections $c^2$ upon its lower end. The lower section C is pivoted to these projections by means of pivots C'. Both sections of the slide are provided with cross-pieces or rounds $C^3$ and $c^3$ and with tracks, (represented by $C^2$ in Fig. 5.) Upon these tracks is adapted to ride a slide $d$, provided with wheels $d'$ and with guides $d^2$ for engaging the under side of the track and keeping the slide upon the track.

$C^4$ is a stop on the bottom of the lower section C to prevent the slide from disengagement from the lower end of the track. The slide is also provided with a flexible strap $d^3$, which may be of leather or any other desired material and upon which is mounted an eye $d^4$, adapted to receive a hook $e^4$, carried by a block $e^5$, containing a pulley $e'$, upon which the rope $e$ for operating the device is adapted to run. This rope $e$ is fixed at one end upon a frame $b^6$, mounted on the cross-bar $b^5$, and runs over a pulley $e^2$, mounted in said frame. The lower end of the rope $e$ runs over the roller $c'$ to a position convenient to the operator on the ground.

$f$ is a sack in which the corn is designed to be placed after husking. These sacks will be deposited around the field in convenient places and will serve to protect the corn from rain and dirt, so that when gathered up the corn may be discharged into the wagon in a clean state. The sacks are provided with fastening devices, preferably consisting of a cord $f'$ and buttons $f^2$. Each sack is also preferably provided with a tongue $f^3$.

From the illustrations and description it will be seen that this particular embodiment of my invention may be operated as follows: The frame $b$ is placed upon the wagon-body in the position shown in the figures and the track-frame $c$ C placed in the position shown in full lines in Fig. 2. A sack of corn is then placed on the slide $d$, and the strap $d^3$ is passed through an eye $f^4$ on the back of the sack. After this the hook $e^4$ upon the block $e^5$ is passed through the eye $d^4$, and the rope $e$ is then in the position shown in Fig. 2. The sack is then loosened by unfastening the cord $f'$ from the buttons $f^2$ and the tongue turned back, if necessary, so that the corn lies in such a position that it will be easily discharged from the sack upon the operation of the device. The operator then pulls upon the rope at the end $e^3$ and draws the slide and sack up the track. When the weight of the slide and sack is transferred to the upper end of the section $c$, it will force it to be tilted on its pivot to the position shown in dotted lines in Fig. 2, which will cause the corn to be dumped into the body of the wagon. Upon releasing the rope the parts will readily assume the position shown in full lines in this figure, and the sack may be removed and replaced by another one. When it is desired to pass along to a new position, the parts will be folded up and placed in the wagon.

Although I have illustrated one practical embodiment of my invention, it will be obvious that many modifications may be made therein and that the invention is not limited to the exact structure and details illustrated; but the spirit thereof is represented in the appended claims.

Having thus described my invention, I claim as new and desire to secure by Letters Patent—

1. A loading device comprising a frame adapted to rest on the top of a wagon, a second frame pivoted to said first-mentioned frame and having a track thereon, and a slide on the track.

2. A loading device comprising a frame adapted to rest on a wagon, a track-frame pivoted thereto, a slide on the track, and means for elevating the slide along the track.

3. A loading device comprising a frame adapted to rest on a wagon, a track-frame in two parts pivoted together, one of said parts being pivoted to said first-mentioned frame, and a slide on the track-frame.

4. A loading device comprising a frame adapted to rest on a wagon, a track-frame pivoted thereto, and a slide on said track-frame having means for securing a sack thereto.

5. A loading device comprising a frame adapted to rest on a wagon, means for securing it to the side of the wagon, a track-frame pivoted to said first-mentioned frame, and a slide on said track-frame.

6. A loading device comprising a frame having downwardly-projecting feet, slots in said feet adapted to fit over the sides of a wagon-body, a screw for fastening the frame to one side of the wagon-body, and a track-frame pivoted to said last-mentioned frame.

7. A loading device comprising a frame adapted to rest on a wagon, a track-frame pivoted thereto, a slide on the track-frame, and means for elevating the slide, comprising a pulley mounted on said first-mentioned frame, an eye connected to the slide, a pulley connected to said eye, and a flexible connection for said pulleys.

8. A loading device comprising a frame adapted to rest on the top of a wagon-body, a second frame pivoted thereto and having a track thereon, a slide adapted to run on said track, and means for moving said slide on the track comprising a pulley mounted on said first-mentioned frame, a flexible strap connected to the slide, a pulley removably connected with said strap, and a rope passing around said pulleys and secured at one end to said first-mentioned frame.

9. A loading device comprising a frame adapted to rest on a wagon, a second frame comprising a section pivoted to said first-mentioned frame and having projections, a second section pivoted to said projections, and means for preventing said parts from swinging on their pivots in one direction beyond a certain point.

10. A loading device comprising a frame, an inclined frame pivoted thereto, a slide on said inclined frame, means for raising said slide along the inclined frame, and means for causing the slide to be tilted upon reaching the upper end of the inclined frame.

11. A loading device comprising a frame adapted to rest on a wagon, an inclined frame pivoted thereto and having a track thereon, a slide on said track, means for raising the slide along the track, and means for causing the slide to be tilted upon reaching the point at which the inclined frame is pivoted to the first-mentioned frame.

12. A loading device comprising a frame adapted to rest on the top of a wagon-body, an inclined frame pivoted thereto and having a track thereon, and a slide on the track provided with a strap having an eye for securing a sack to the slide.

In testimony whereof I have signed my name to this specification in the presence of two subscribing witnesses.

JAMES P. FOSTER.

Witnesses:
J. F. DECK,
H. B. WELSH.